Oct. 10, 1950     E. M. HOUT     2,525,678
WEED PULLER
Filed June 5, 1947
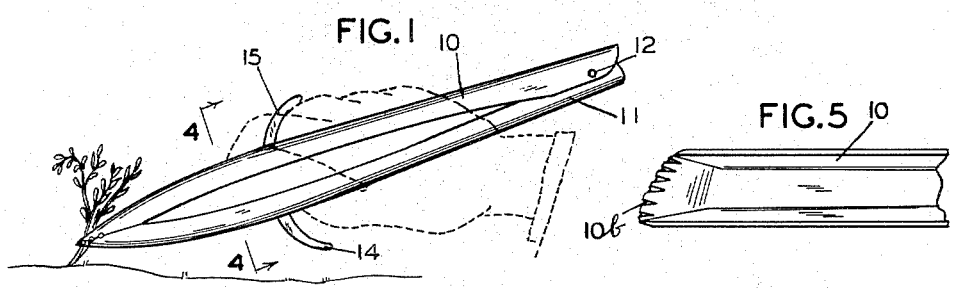
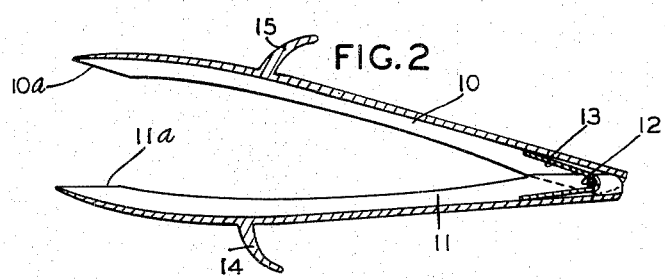
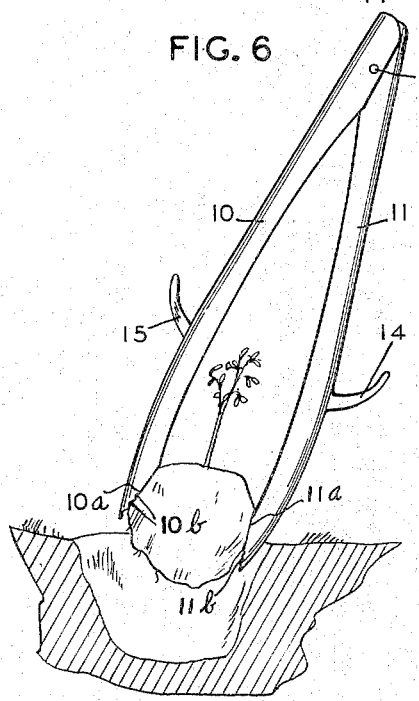
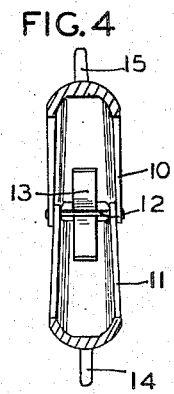
Inventor
ELLIE M. HOUT
By Williamson & Williamson
Attorneys Patented Oct. 10, 1950

2,525,678

UNITED STATES PATENT OFFICE 2,525,678

WEED PULLER

Ellie M. Hout, Minneapolis, Minn.

Application June 5, 1947, Serial No. 752,850

2 Claims. (Cl. 294—50.8)

This invention relates to hand operated garden tools and particularly to one which is well adapted to a wide variety of uses in the garden including transplanting plants and pulling weeds.

It is an object of my invention to provide a garden tool particularly adapted for transplanting plants and pulling weeds.

It is a further object to provide a garden tool the outer surfaces of which have a smooth contour to facilitate insertion into the ground.

It is another object of my invention to provide a hand operated garden tool having novel and improved hand gripping means thereon.

More specifically it is an object to provide a relatively small and compact unit which has a pair of opposed hinged members having smooth outer contours for at least the greater portions of their lengths and having hand engaging gripping lugs to facilitate easy operation of my improved tool.

The above and other objects and advantages of the invention will more fully appear from the following description made in connection with the accompanying drawings, wherein like reference characters refer to similar parts throughout the views, and, in which:

Figure 1 is a perspective view showing my garden tool in weed pulling operative position;

Figure 2 is a horizontal longitudinal sectional view taken substantially along line 2—2 of Figure 3;

Figure 3 is a side elevational view of my garden tool;

Figure 4 is a transverse sectional view taken substantially along the line 4—4 of Figure 1;

Figure 5 is a fragmentary view of the forward end of one of the members of my garden tool showing the plant gripping fluted forward extremity thereof; and Figure 6 is a perspective view of the tool in transplanting operative position.

As illustrated in Figures 1 through 6 I provide a garden tool having a pair of elongated jaw members 10 and 11 each of which is longitudinally curved from end to end to present a continuous smooth convex outer surface. As best shown in Figure 4 each member has a curved cross-sectional shape. The intermediate portions of the inner longitudinal edges of the jaw members 10 and 11 take a generally concave shape as is best shown in Figures 1, 2 and 6.

The forward end portions of the inner edges are flattened to provide plant gripping elements 10a and 11a respectively of the members 10 and 11. The extreme forward ends of the jaw members 10 and 11 are cut generally diagonally of the longitudinal center lines thereof as is best shown in Figure 5 and are somewhat slightly rounded to present smooth plant and ground engaging ends. Flutings 10b and 11b are respectively formed in the extreme forward ends of the members 10 and 11 as is best shown in Figures 3 and 5.

The rear ends of the members 10 and 11 are connected as by a pin 12 through apertures in rear portions thereof, the rear portion of member 10 being slightly wider than the rear portion of member 11 to permit the rear of member 11 to be received between the sides of the rear portion of member 10 as is shown in Figures 1, 3, 4 and 6. The rear portion of member 10 is widened and the rear portion of member 11 is diminished in width for a sufficient distance forwardly to permit a smooth operating pivotal joint about the pin 12. A resilient spring strip 13 is bent along its central transverse axis and inserted between the rear portions of the members 10 and 11, its forward ends resiliently pressing outwardly against the respective inner surfaces of the rear portions of members 10 and 11 and the transverse bend engaging against the pin 12 to ride thereon.

Curved finger engaging lugs 14 and 15 are integrally fixed to intermediate portions of the outer surfaces of members 10 and 11 respectively and extend laterally thereof as is best shown in Figures 1, 2, and 6 of the accompanying drawings.

In the operation of my tool the outer surfaces of the members 10 and 11 are gripped in the hand of an operator as shown in Figure 1 and the index finger is disposed below the lug 15 to prevent slippage of the hand during the upward pulling of the tool.

In the weed pulling use of my tool the jaw members 10 and 11 are initially spread and the tool disposed so that the lower portions 10a and 11a and the flutings 10b and 11b have the weed to be pulled interposed therebetween. The jaw members 10 and 11 are then squeezed together into the position shown in Figure 1, the flutings 10b and 11b tightly engaging the weed as near to the roots as possible and by an upward pulling movement on the tool the weed is pulled out of the ground by its roots. The tendency of the flutings 10b and 11b and the flattened end surfaces 10a and 11a is to grip and tightly hold the weeds without cutting them which permits the weeds to be pulled out by the roots.

In the transplanting operation the plant to be moved is interposed between the opened jaws of the tool and the forward portions of the jaw members 10 and 11 and are pushed into the ground in open position surrounding the plant. After the tool has been inserted into the ground a sufficient distance to permit the plant to be pulled out "roots and all" the jaws are pressed together and the lower portions of the roots of the plant are tightly embraced by the lower portions of the jaw members 10 and 11 along with the dirt surrounding said roots and by an upward pulling movement with the jaws 10 and 11 held tightly together by the operator's hand having the index finger thereof disposed below the lug 15 the plant is raised out of its position in the earth along with the dirt surrounding the roots as is shown in Figure 6. The forward ends of the members 10 and 11 form a relatively sharp spading edge which may be used to loosen the dirt and permit the plant to be easily removed in the event that the earth surrounding the plant has become hard. This is generally done with the jaws open and the forward blade portions of the tool repeatedly inserted into the ground surrounding the plant to form a circular area of loosened dirt there-around. When the plant has been removed from its old position in the ground it may be immediately re-planted in any desired new position in the ground by merely thrusting the tool holding the plant between the jaw members 10 and 11 into the ground. With the tool and plant inserted into the ground in the new position the jaws are then spread apart by outward pressure on the inner surfaces of the curved lugs 14 and 15 by the thumb and the second finger of the hand holding the tool. When the jaws have been spread a sufficient distance to permit the tool to be removed without removing the plant the tool is withdrawn and used to tamp the earth down around the roots of the plant to complete the transplanting operation. The plant may be put into a pot as well as transplanted into the ground by approximately the same operation as previously described. In the event that a great number of plants are to be set out in the spring such as tomato plants and the like which have been initially germinated under artificial heat indoors the box containing said plants is placed near at hand and my tool used to remove the plants from the box as previously described and re-plant them in the garden as previously described.

It will be seen that the smooth continuous curve of the outer portions of members 10 and 11 form a smooth tapered lower end portion of the tool in closed position which permits relatively easy insertion into the ground and also facilitates removal from the ground in the transplanting operation. By providing the curved lugs which engage the fingers of the hand of the operator, outer spreading pressure may be exerted on the jaw members as well as pushing and pulling pressure. Obviously the spring 13 will exert sufficient spreading pressure to normally retain the members 10 and 11 in spread position as shown in Figure 2 but in the transplanting operation where the plant is to be left in its new position additional force must be exerted by pressure on the inner curved surfaces of the lugs 14 and 15 as previously described.

The concave shape of the inner longitudinal edges forms an open space between the said inner edges even when the lower portions 10a and 11a of the jaw members 10 and 11 are in tight engagement. This spacing serves several functions. It prevents the operator's hand from being pinched during the operation of the tool. It also permits easy cleaning and allows excess dirt to drop out during the operation of the tool. The tool members 10 and 11 when in closed position form an inner tubular recess in which the plants are retained without harming them during the transplanting operations. This is well illustrated in Figures 2 and 4.

In the transplanting operation the dirt is compacted around the roots and securely held there until the plant is re-placed in its new position. There is a combinative effect between the lugs 14 and 15 and the blades formed at the lower ends of the members 10 and 11 during the spading operation as well as during the plant engaging operation.

I have found that a convenient width for my tool is approximately 1¼ inches and a convenient length to be approximately 8 to 12 inches although for certain uses it might well be convenient to make the tool much larger or much smaller and I am in no way limiting myself to the above disclosed dimensions. I have described only two uses for my tool although it obviously has a great many more valuable uses around the garden and it is by no means limited to the uses described. It will be seen that an extremely efficient and compact tool has been provided which has a large number of functions around the garden.

I have found that having at least a portion of the forward ends of plant gripping elements 10a and 11a disposed diagonally relative to the longitudinal center lines of the members 10 and 11, greatly facilitates the use of my tool, especially as a weed puller, by permitting a greater portion of the weed to be gripped between said elements 10a and 11a while the main body of the tool is disposed at an acute angle relative to the ground surface with sufficient clearance for easy operation.

It will, of course, be understood that various changes may be made in the form, details, arrangement and proportions of the various parts without departure from the scope of the present invention, which generally stated, consists in the matter shown and described, and set forth in the appended claims.

What I claim is:

1. A hand-operated garden tool particularly adapted for transplanting plants and pulling weeds, comprising a pair of opposed elongated jaw members having their rear portions pivotally connected, said jaw members being continuously curved for at least the greater portions of their lengths to form concave plant-gripping cooperating interiors, and the forward extremities being diagonally disposed relative to the longitudinal center lines of said jaw members defining spade elements whereby a plant may be initially loosened in the ground, said spade ends being subsequently inserted therein surrounding said plant, and thereafter the plant being gripped between said members to remove the same from the ground, and a laterally outstanding hand-engaging lug curved rearwardly and fixed to each of said members to prevent hand-slippage on said tool.

2. A hand operated garden tool particularly adapted for transplanting plants and pulling weeds comprising a pair of opposed elongated jaw members having their rear portions pivotally connected, the inner and outer surfaces having a generally smooth concavo-convex shape both longitudinally and transversely extending continuously a substantial distance from the forward extremities thereof to form a pair of spading and plant-gripping blades whereby insertion into the ground is facilitated even when a plant is tightly wedged between said blades, and a laterally outstanding finger-engaging lug fixed to an intermediate portion of each of said members a substantial distance forward of the rear extremities thereof and curved slightly rearwardly to permit spreading force to be exerted against said lugs between engaged fingers of one hand of the user and to permit said hand to tightly grip said two members therein to wrap said fingers transversely around said two members.

ELLIE M. HOUT.

REFERENCES CITED

The following references are of record in the file of this patent:

UNITED STATES PATENTS

| Number | Name | Date |
| --- | --- | --- |
| 881,056 | Cheesman | Mar. 3, 1908 |
| 1,411,316 | Vestal | Apr. 4, 1922 |

FOREIGN PATENTS

| Number | Country | Date |
| --- | --- | --- |
| 24,088 | Great Britain | Oct. 31, 1907 |